(12) United States Patent
Ouyang et al.

(10) Patent No.: US 8,255,016 B2
(45) Date of Patent: Aug. 28, 2012

(54) FLIP-TYPE PORTABLE ELECTRONIC DEVICE

(75) Inventors: Zhi-Bin Ouyang, Shenzhen (CN); Chia-Wei Hu, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 379 days.

(21) Appl. No.: 12/618,828

(22) Filed: Nov. 16, 2009

(65) Prior Publication Data

US 2010/0259142 A1    Oct. 14, 2010

(30) Foreign Application Priority Data

Apr. 10, 2009   (CN) .......................... 2009 1 0301477

(51) Int. Cl.
*H04B 1/38* (2006.01)
*H04M 1/00* (2006.01)

(52) U.S. Cl. .................. 455/575.1; 455/90.3; 455/575.3
(58) Field of Classification Search .................. 455/566, 455/575.1, 575.3, 575.4, 575.8
See application file for complete search history.

(56) References Cited

U.S. PATENT DOCUMENTS

| | | | |
|---|---|---|---|
| 7,519,350 B2 * | 4/2009 | Yamamoto et al. | 455/347 |
| 2004/0109559 A1 * | 6/2004 | Lee | 379/433.04 |
| 2009/0054115 A1 * | 2/2009 | Horrdin et al. | 455/575.8 |
| 2009/0219259 A1 * | 9/2009 | Kwon | 345/173 |
| 2009/0264160 A1 * | 10/2009 | Mochizuki et al. | 455/566 |
| 2010/0048249 A1 * | 2/2010 | Furuta | 455/566 |
| 2010/0203924 A1 * | 8/2010 | Hirota | 455/566 |

* cited by examiner

*Primary Examiner* — Simon Nguyen
(74) *Attorney, Agent, or Firm* — Altis Law Group, Inc.

(57) ABSTRACT

A flip-type portable electronic device is provided. The flip-type electronic device includes a housing and a cushion member. The housing comprises an first body portion and a second body portion secured to the first body portion. The cushion member is attached to the second body portion.

13 Claims, 6 Drawing Sheets

FLIP-TYPE PORTABLE ELECTRONIC DEVICE

BACKGROUND

1. Technical Field

The present disclosure relates to portable electronic devices, particularly, to a flip-type portable electronic device.

2. Description of Related Art

Portable electronic devices, such as mobile phones and personal digital assistants (PDAs) are widely used all over the world. Especially, the flip-type portable electronic devices are popular among consumers.

A typical flip-type portable electronic device includes a body member, a cover member, and a hinge assembly used to rotatably connect the body member and the cover member. To make the cover member stop at a maximal angle relative to the body member, one end of the cover member usually abuts against the body member.

However, after repeated use, the cover member and the body member may both wear out because of their frequent collision with each other.

Therefore, there is room for improvement within the art.

BRIEF DESCRIPTION OF THE DRAWINGS

Many aspects of the flip-type portable electronic device can be better understood with reference to the following drawings. These drawings are not necessarily drawn to scale, the emphasis instead being placed upon clearly illustrating the principles of the present flip-type portable electronic device. Moreover, in the drawings like reference numerals designate corresponding sections throughout the several views.

DETAILED DESCRIPTION

Figure 1:
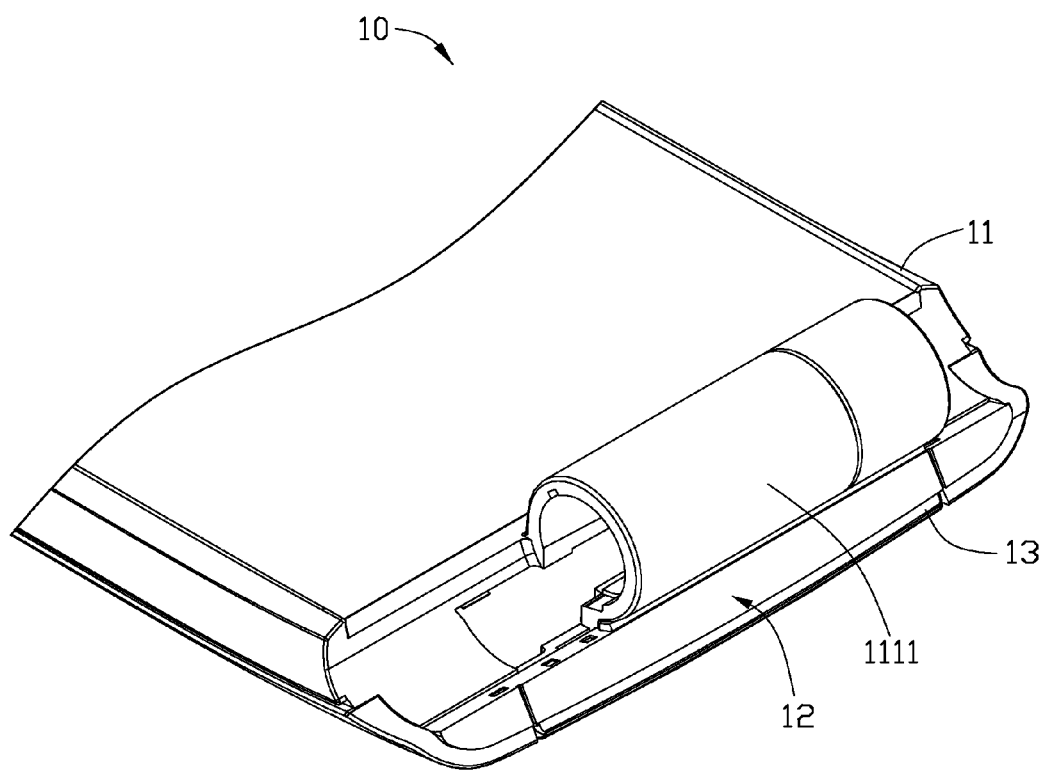
FIG. 1 is an assembled, isometric view of a flip-type portable electronic device, in accordance with an exemplary embodiment.
Figure 2:
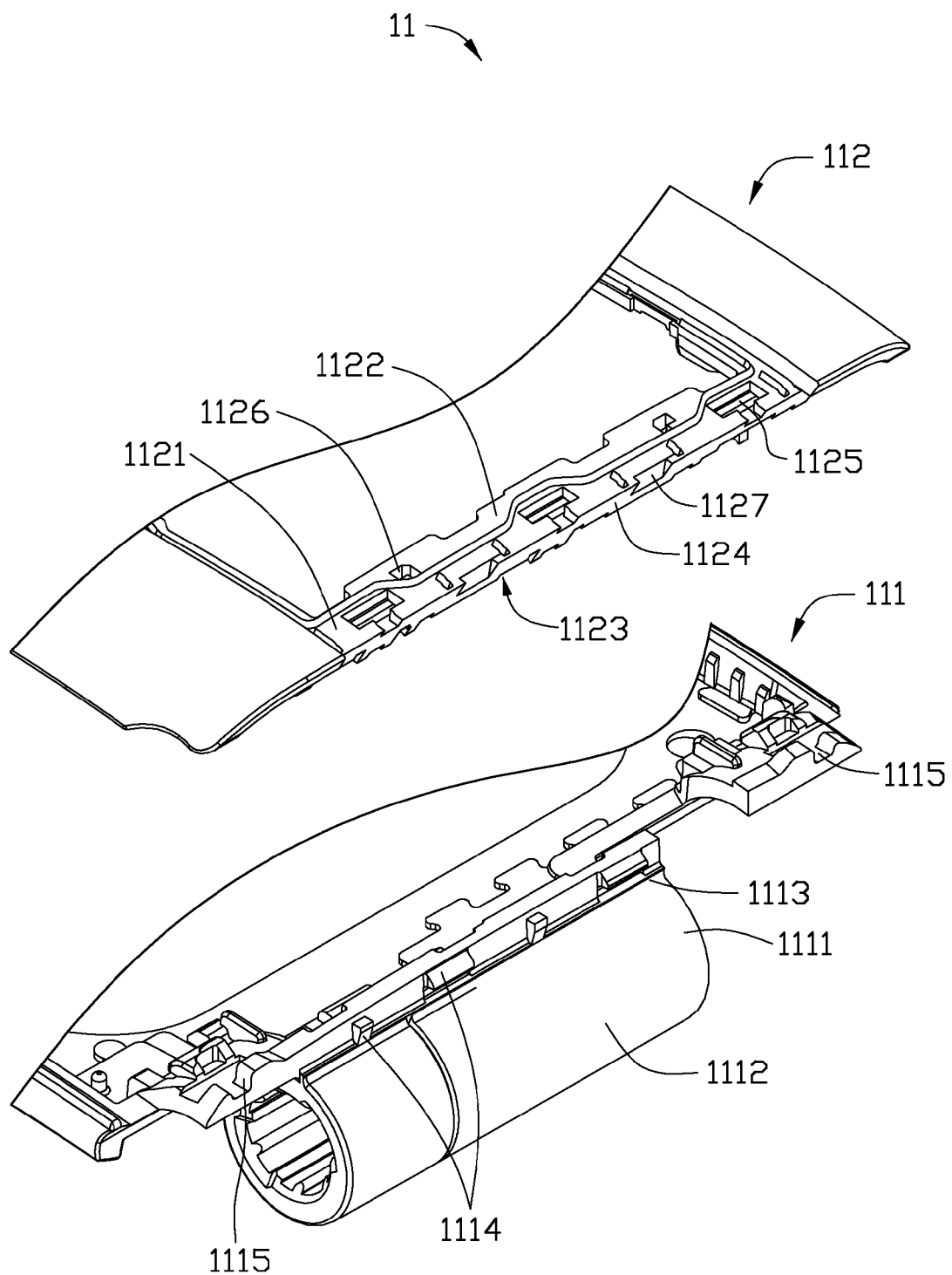
FIG. 2 is a partially exploded, isometric view of a flip-type portable electronic device shown in FIG. 1.
Figure 3:
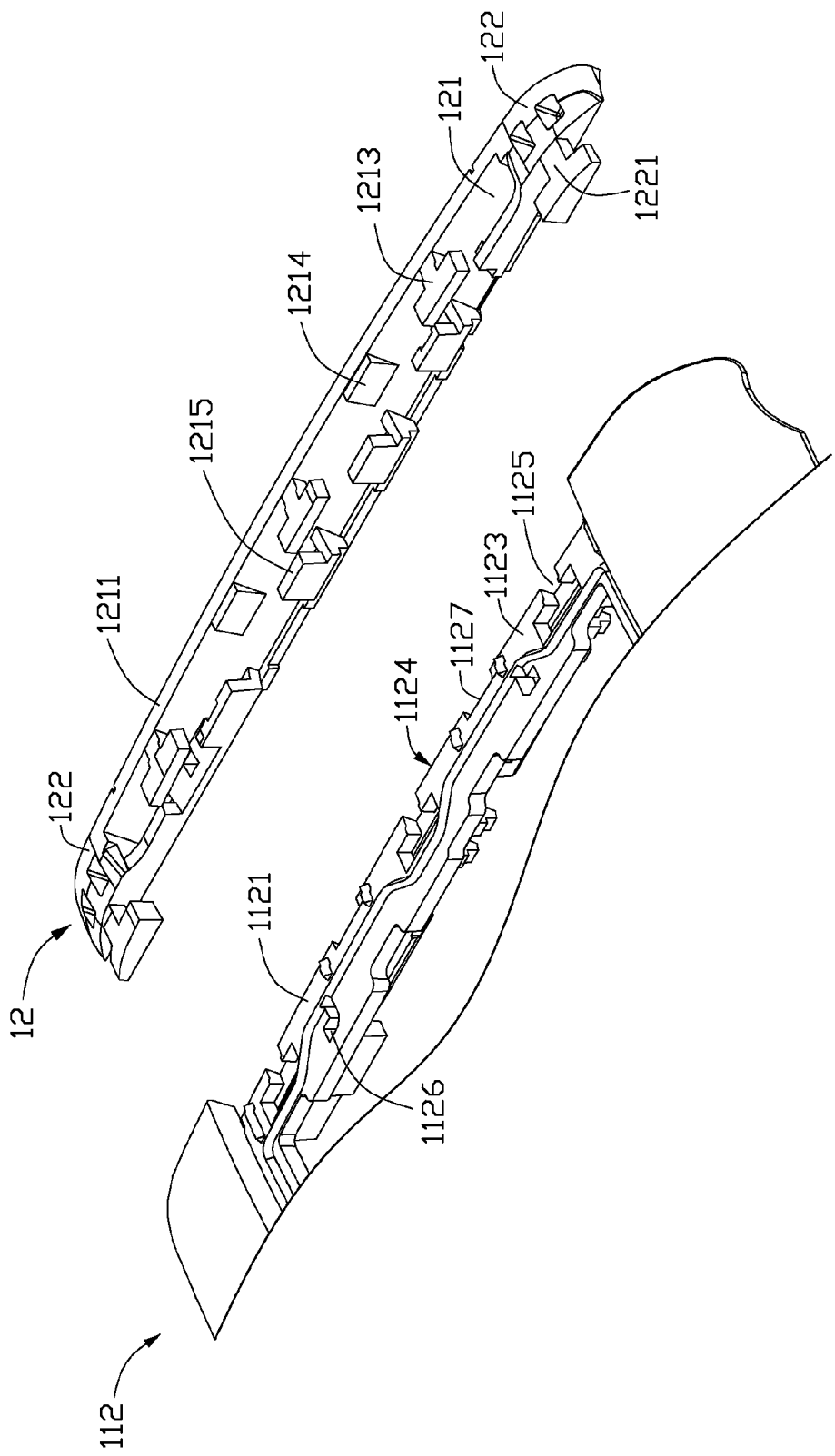
FIG. 3 is another partially exploded, isometric view of a flip-type portable electronic device shown in FIG. 1.
Figure 4:
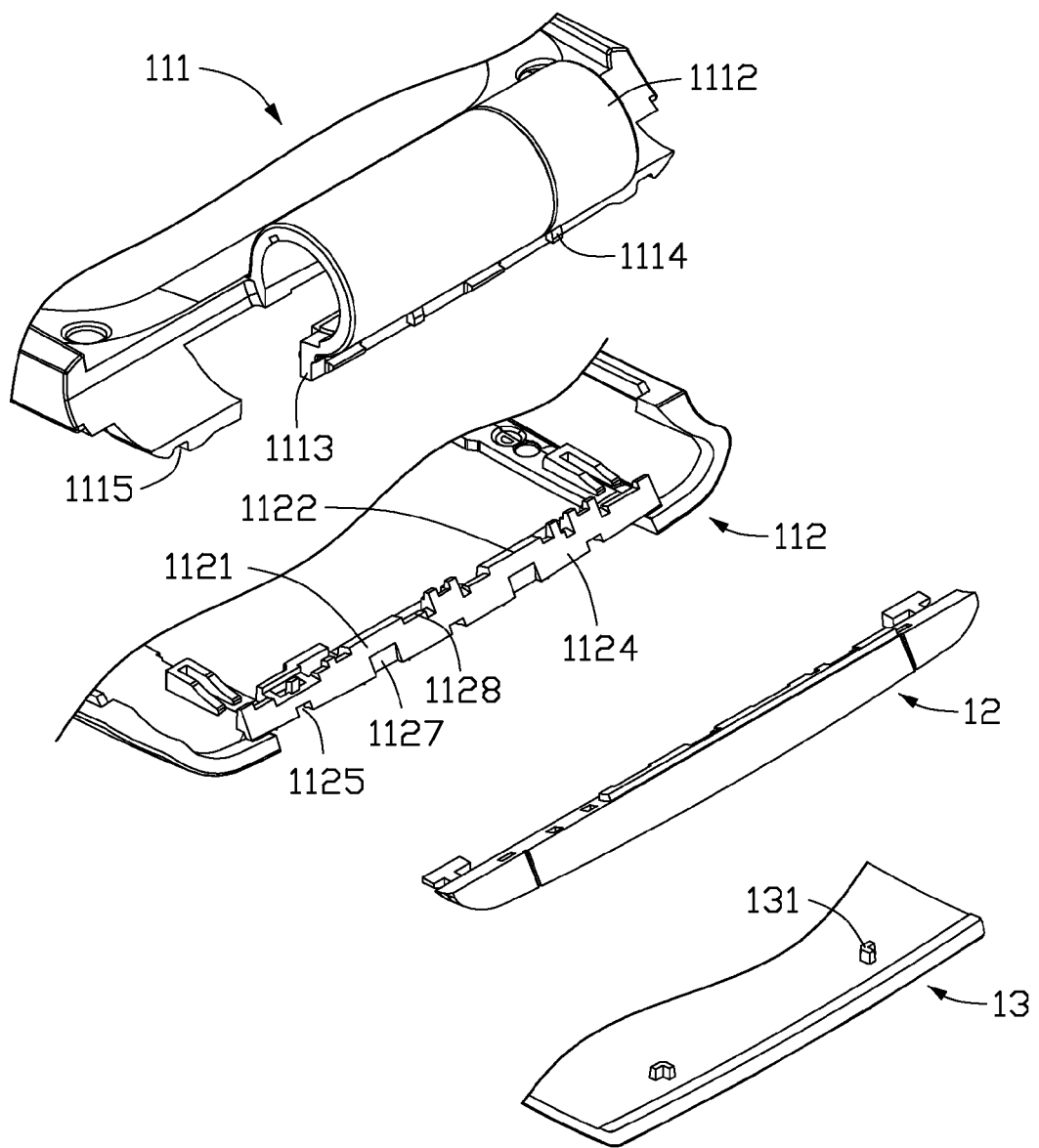
FIG. 4 is an exploded, isometric view of a flip-type portable electronic device shown in FIG. 1.

Referring to FIG. 3, FIGS. 1 and 4 show an exemplary flip-type portable electronic device. The flip-type portable electronic device includes a housing 10, a flip cover (not shown), and a hinge (not shown). The flip cover is rotatably mounted to the housing.

The housing 10 includes a main body 11, a cushion member 12, and a screen window 13. The cushion member 12 is fastened to the main body 11. The screen window 13 is secured to the main body 11. The cushion member 12 is sandwiched between the main body 11 and the screen window 13.

The main body 11 includes an first body portion 111 and a second body portion 112. The first body portion 111 includes a hollow pivoting sleeve 1111 formed at one end of the first body portion 111. The pivoting sleeve 1111 is generally tubular, and includes a peripheral wall 1112 with a free end 1113 facing and spaced from the first body portion 111. The pivoting sleeve 1111 is used to rotatably mount the hinge. A plurality of clamps 1114 protruding from the free end 1113 of the peripheral wall 1112 latch with the second body portion 112. The first body portion 111 defines two latch slot 1115 adjacent to two opposite sides of the pivoting sleeve 1111. The latch slots 1115 are used to latch with the cushion member 12.

Figure 5:
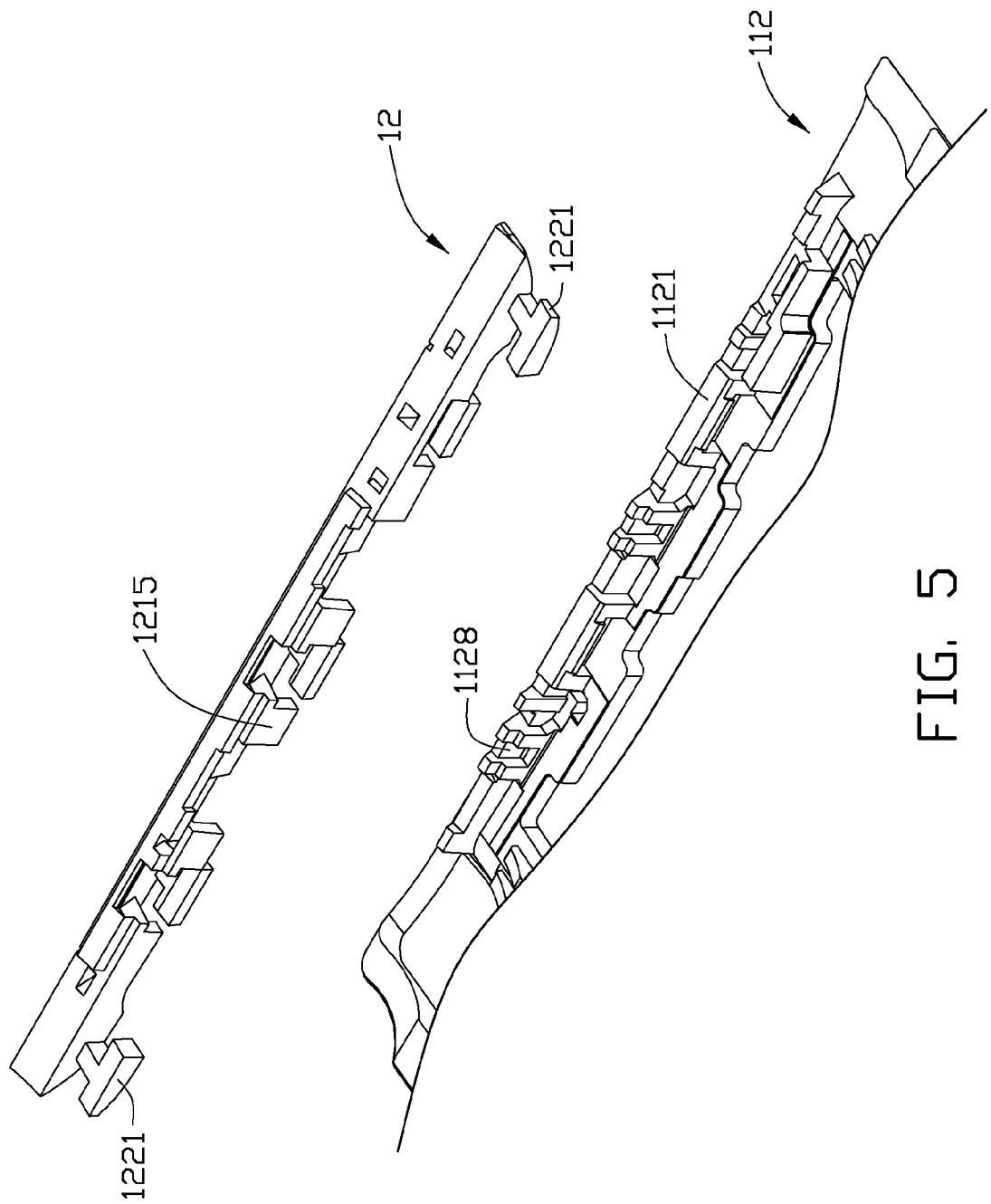
FIG. 5 is similar to FIG. 3, but viewed from another aspect.
Figure 6:
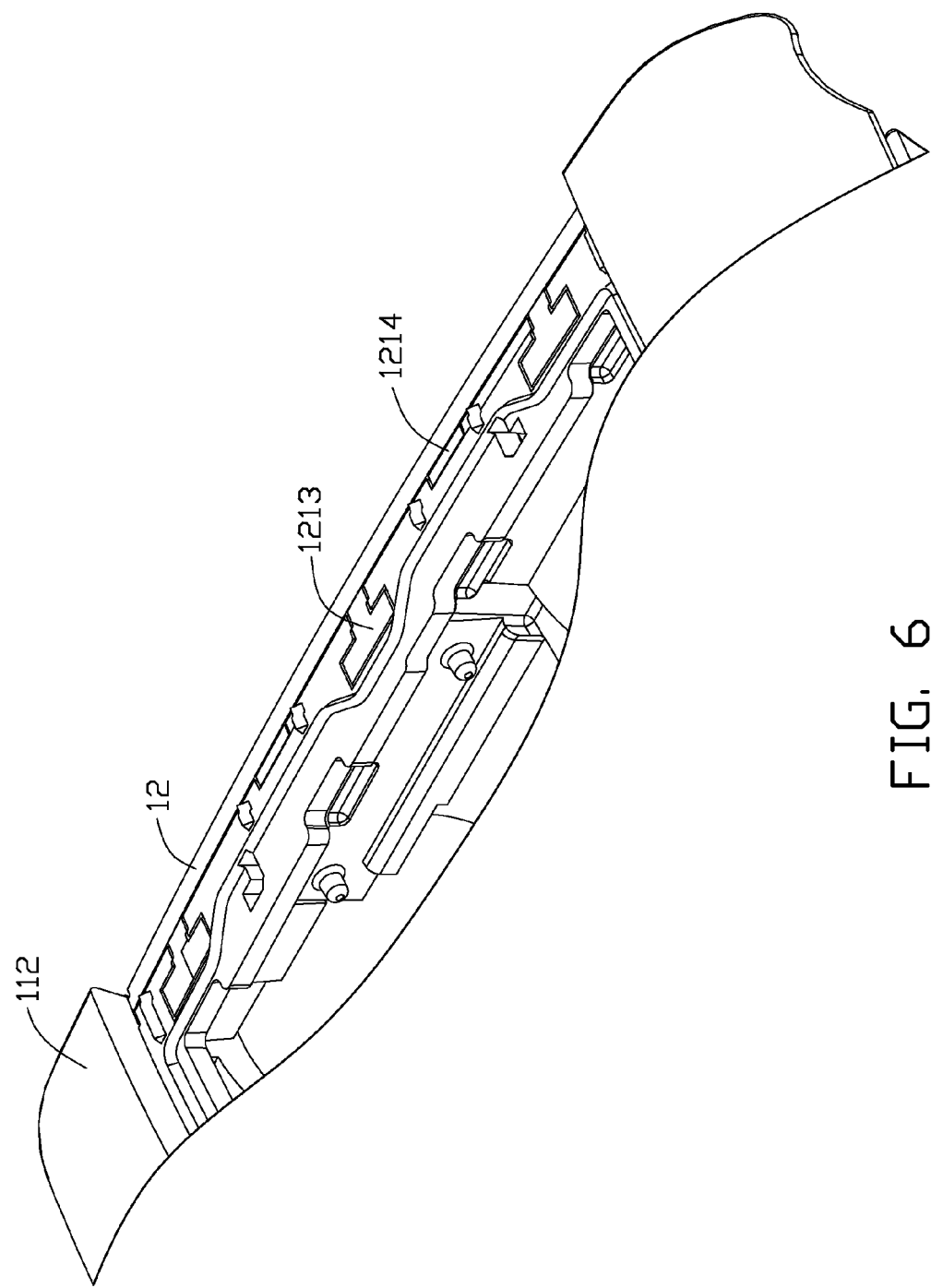
FIG. 6 is a partially assembled view of the flip-type portable electronic device shown in FIG. 1.

Referring to FIGS. 3, 4 and 5, the second body portion 112 includes a mounting compartment 1121 formed at one end thereof. The mounting compartment 1121 includes an first wall 1122, a second wall 1123, and an exterior wall 1124. The first wall 1122 faces the screen window 13. The second wall 1123 faces the first body portion 111. The exterior wall 1124 faces the cushion member 12. The first wall 1122 spacedly defines a plurality of latch grooves 1125. In this exemplary embodiment, the latch groove 1125 can be "T"-shaped, and the number of the latch grooves 1125 can be three. The latch grooves 1125 communicate through the exterior wall 1124, used to latch with the cushion member 12. The first wall 1122 further defines a plurality of latch holes 1126 adjacent to the latch grooves 1125. In this exemplary embodiment, the number of the latch holes 1126 can be two and "L"-shaped, and the two latch holes 1126 can be spacedly defined in the first wall 1122, for latching with the screen window 13. The exterior wall 1124 defines a plurality of notches 1127.

In this exemplary embodiment, the number of the notches 1127 can be two, and each notch 1127 can be defined between two adjacent latch grooves 1125, for latching with the cushion member 12. The second wall 1123 defines a plurality of clamp cavities 1128, corresponding to the clamps 1114 of the first body portion 111. Each clamp latches into one clamp cavity 1128, thus mounting the second body portion 112 to the first body portion 111.

Referring to FIG. 3, the cushion member 12 is generally an arcuate block, and includes a main body 121 and two connecting portions 122. The two connecting portions 122 are integrally formed at two opposite ends of the main body 121. Each connecting portion 122 has a latch 1221 protruding therefrom, corresponding to the latch slot 1115. In this exemplary embodiment, each latch 1221 can be "T"-shaped, for latching with the latch slot 1115. The main body 121 includes an first side 1211 and a second side 1212 opposite to the first side 1211. A plurality of latch blocks 1213 protrude from the main body 121 adjacent to the first side 1211, facing inwardly. The latch blocks 1213 latch with the latch grooves 1125. A plurality of protrusions 1214 also protrude from the main body 121 adjacent to the first side 1211, facing inwardly. The protrusions 1214 latch with the notches 1127. A plurality of projections 1215 protrude from main body 121 adjacent to the second side 1212, facing upwardly. The projections 1215 clamp with the clamp cavities 1128. The cushion member 12 is made of rubber.

The screen window 13 is a plate. Two securing poles 131 protrude from the screen window 13, corresponding to the latch holes 1126. Each securing pole 131 is inserted into one latch hole 1126, and then secured to the second body portion 112, for example, by hot-melting.

In pre-assembly, the projections 1215 are inserted into the clamp cavities 1128; then the latch blocks 1213 are inserted into the latch grooves 1125 and the protrusions 1214 are latched into the notches 1127. Thus, the cushion member 12 is attached to the mounting compartment 1121 of the second body portion 112.

In further assembly, the first body portion 111 is attached to the second body portion 112 from one side, with the clamps 1114 clamping with the clamping cavities 1128 and the latches 1221 latching with the latch slots 1115. The screen window 13 is attached to the second body portion 112 from the other side, with the securing poles 131 are inserted into the latch holes 1126. Then the securing poles 131 are secured to the second body portion 112 by hot-melting.

In use, the flip cover is rotated relative to the housing 10 about the hinge until the flip cover abuts against the cushion member 12. At this time, the flip cover is at a maximum opening angle relative to the housing. Because of the cushion member 12, the flip cover will no longer damage the housing 10, thus protecting the flip cover and the housing from failure.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A flip-type portable electronic device comprising:
    a main body comprising an first body portion and a second body portion secured to the first body portion, the second body portion defining a plurality of latch slots;
    a screen window secured to the second body portion; and
    a cushion member sandwiched between the second body portion and the screen window, the cushion member including a plurality of latches, each of the latches being "T"-shaped, and the latches latching with the latch slots.

2. The flip-type portable electronic device as claimed in claim 1, wherein the cushion member is made of rubber.

3. The flip-type portable electronic device as claimed in claim 1, wherein the second body portion defines a plurality of latch grooves, the cushion member includes a plurality of latch blocks, the latch blocks latch into the latch grooves.

4. The flip-type portable electronic device as claimed in claim 3, wherein each latch block is "T"-shaped, and each latch groove is "T"-shaped.

5. The flip-type portable electronic device as claimed in claim 3, wherein the second body portion defines a plurality of notches, the cushion member includes a plurality of protrusions, the protrusions latch into the notches.

6. The flip-type portable electronic device as claimed in claim 5, wherein each protrusion is sandwiched between two adjacent latch blocks.

7. The flip-type portable electronic device as claimed in claim 3, wherein the second body portion defines a plurality of clamp cavities, the cushion member includes projections, the projections clamp with the clamp cavities.

8. The flip-type portable electronic device as claimed in claim 7, wherein the latch grooves are opposite to the clamp cavities.

9. The flip-type portable electronic device as claimed in claim 1, wherein the screen window includes securing poles, the second body portion defines latch holes, each securing pole is inserted into one latch hole.

10. A flip-type portable electronic device comprising:
    a main body comprising an first body portion and a second body portion secured to the first body portion, the second body portion defining a plurality of latch slots;
    a screen window secured to the second body portion; and
    a cushion member sandwiched between the second body portion and the screen window, with part of the cushion member exposing out of the second body portion; the cushion member including a plurality of latches, each of the latches being "T"-shaped, and the latches latching with the latch slots.

11. The flip-type portable electronic device as claimed in claim 10, wherein the cushion member is made of rubber.

12. A housing comprising:
    a main body comprising an first body portion and a second body portion secured to the first body portion, the second body portion defining a plurality of latch slots;
    a screen window secured to the main body; and
    a cushion member sandwiched between the second body portion and the screen window, with part of the cushion member exposing out of the main body; the cushion member including a plurality of latches, each of the latches being "T"-shaped, and the latches latching with the latch slots.

13. The flip-type portable electronic device as claimed in claim 12, wherein the cushion member is made of rubber.

* * * * *